United States Patent [19]

Miller

[11] 3,791,072
[45] Feb. 12, 1974

[54] GATE ARM CLAMP AND SERRATING LEVER

[75] Inventor: Harold L. Miller, Grosse Pointe Park, Mich.

[73] Assignee: Vemco Products Inc., Detroit, Mich.

[22] Filed: July 17, 1970

[21] Appl. No.: 55,840

[52] U.S. Cl............................ 49/141, 49/49, 49/381
[51] Int. Cl. ............................................. E05c 15/02
[58] Field of Search....... 269/238, 257; 24/248 BC, 24/248 L, 248 RC, 248 CR, 115 F, 248, 24/170, 191; 52/98; 49/141, 247, 381, 49; 256/13.1

[56] References Cited
UNITED STATES PATENTS

| 3,686,794 | 8/1972 | Sakamoto et al........................ 49/49 |
| 410,275 | 9/1889 | Hadfield............................ 24/134 R |
| 2,137,193 | 11/1938 | Stafford.............................. 49/49 X |
| 512,543 | 1/1894 | Froberg................................ 24/248 |
| 1,285,981 | 11/1918 | Glassburn.......................... 24/248 B |
| 1,331,291 | 2/1920 | Sulzner................................. 24/170 |
| 1,653,235 | 12/1927 | Sorell............................. 24/248 RC |
| 3,514,091 | 5/1970 | Johnson et al.................. 269/238 X |

FOREIGN PATENTS OR APPLICATIONS

| 467,040 | 2/1969 | Switzerland.......................... 24/170 |

Primary Examiner—Andrew V. Kundrat
Attorney, Agent, or Firm—Thomas N. Young

[57] ABSTRACT

An improved clamp for mounting the wooden arm of an automatic parking gate onto the actuating mechanism of the parking gate. The clamp features a lever operated serrated clamping edge which grips the arm when clamped into place and creates a fracture line in the arm along the serration where the arm will break if struck by an automobile. In the event the arm is broken, the arm, now about 6" shorter, can be reinserted and reused. The arm can therefore be used a number of times after accidental breakage until it is too short for practical use.

4 Claims, 5 Drawing Figures

PATENTED FEB 12 1974 3,791,072

INVENTOR
HAROLD L. MILLER
BY
Farley, Forster & Farley
ATTORNEYS

GATE ARM CLAMP AND SERRATING LEVER

BACKGROUND OF THE INVENTION

The arms of automatic parking gates are subject to much abuse, usually from accidental automobile contact. Therefore, wooden arms which will easily fracture along a fracture line have been used. By providing the fracture line at the clamp, only a short portion of the arm is broken off and the arm can be immediately reused with a new fracture line created by the serrations on the clamping member. It is, therefore, desireable to make removal and replacement as quick and simple as possible.

SUMMARY OF THE INVENTION

The present invention utilizes a lever actuated serrated edge to clamp the arm in the holder. A simple quick motion of the lever drives the serrated edge into the arm creating the fracture line in the arm and also positions the other end of the lever over the locking means. A pad lock is then simply inserted. Optionally, the arm can be inserted, the lever actuated and then released. The arm is then removed from the holder, turned over and reinserted in the holder in the same position. The lever is again actuated and pad locked into place. The serrated edge has thus created serrations in both sides of the arm for an improved fracture line. The arm can be clamped into place quickly including the reversal which provides a more effective fracture line.

DESCRIPTION OF THE PREFERRED EMBODIMENTS

Figure 1:
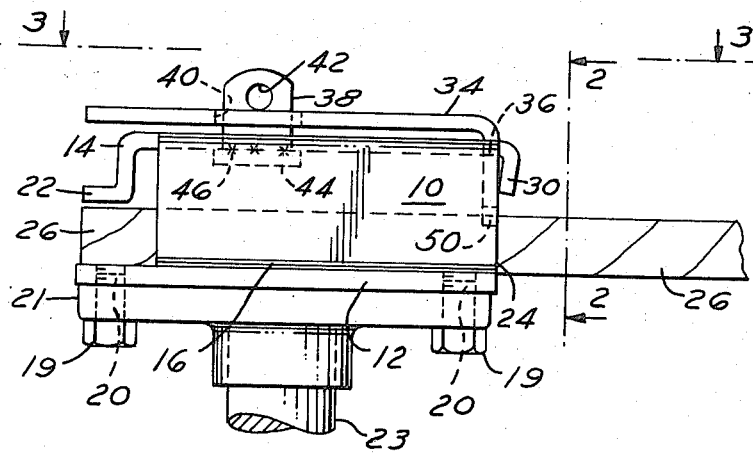
FIG. 1 is a top elevation of the clamp.
Figure 3:
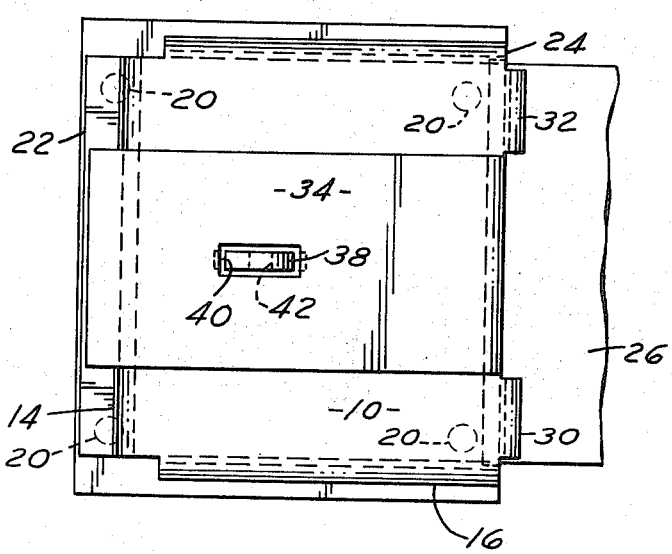
FIG. 3 is a front elevation of the clamp.
Figure 4:
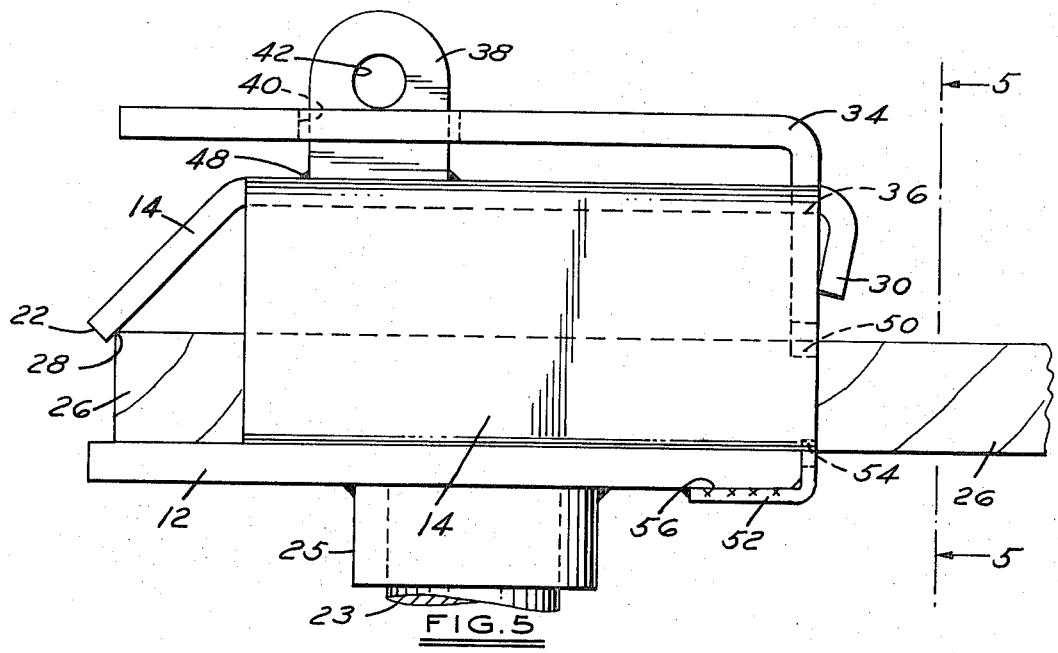
FIG. 4 is a top elevation of an alternate clamp.

The clamp comprises a holder generally denoted by 10 in FIG. 1 and consisting of a base plate 12 and cover plate 14 welded together at 16 and 18. The base plate 12 may be mounted by any suitable means such as with bolts 19 inserted in the threaded holes 20, to the actuating means of the parking gate here represented by the flange 21 and shaft 23. Alternately, a hub 25 may be welded to the base plate 12 as shown in FIG. 4. The ends 22 and 24 of the cover 14 are open to permit insertion of the parking gate arm 26. Alternately, the end 22 may be partially closed as shown at 28, in FIG. 4, to provide a stop for the arm 26 when inserted. Returning to FIGS. 1, 2 and 3, the cover 14 has two tabs 30 and 32 bent over at the end 24. The tabs 30 and 32 retain the lever 34 and prevent the lever 34 from slipping out the end 24 when unlocked, unless disassembly is required. The lever 34 rotates about a fulcrum 36 where it engages the cover plate 14. In the locked position, as shown, a locking tab 38 extends through a slot 40 in the lever 34 and a hole 42 is provided in the locking tab for a pad lock, not shown. The locking tab 38 is welded to the cover plate 14 at 44 below a slot 46 in the cover plate 14 through which it extends. Optionally, the locking tab 38 could be welded to the cover plate 14 on top, as shown at 48 in FIG. 4.

Figure 2:
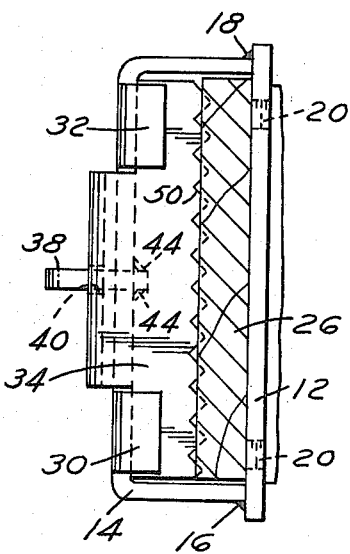
FIG. 2 is an end elevation of the clamp.

The lever 34 includes serrations 50 shown in FIG. 2 which engage deeply into the arm 26. Other approaches such as a knife edge may be utilized to put a deep cut or other transverse lined weakness into the arm 26 and thereby create a relatively clean fracture line in the arm when it is broken off. Optionally, when the arm is mounted and clamped, the serrations may be put in the one side of the arm, then the lever arm released, the arm removed, turned over, reinserted, and reclamped. In this manner, the fracture lines will be created on both sides of the arm at about the same location to ensure a clean break.

Figure 5:
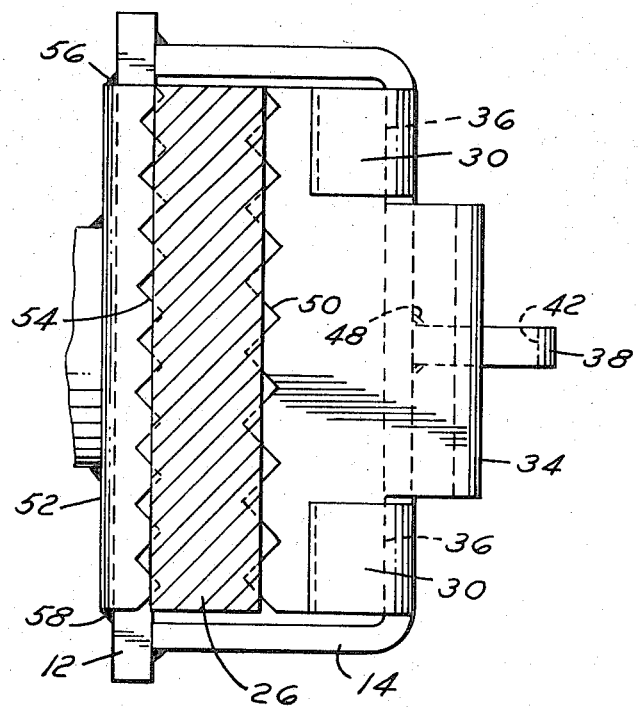
FIG. 5 is an end elevation of the alternate clamp.

In the alternate embodiment, shown in FIGS. 4 and 5, an extra piece 52 having serrations 54 is shown welded to the base 12 at 56 and 58. The serrations 50 on the lever 34 may therefore be eliminated and a straight edge utilized, or both serrations and straight edge can be utilized to provide the fracture line.

The clamp is quickly and easily operated without tools merely by sliding in the arm, pushing down on the lever arm until the slot 40 fits over the locking tab 38 and a pad lock inserted.

I claim:

1. In a traffic control gate for controlling the flow of traffic through a lane: actuating means, a gate arm of readily fracturable material and being of elongated and substantially flat configuration, gate clamping means for attaching the gate arm to the actuating means, said clamping means comprising a holding member secured to the actuating means for receiving the gate arm, and a clamp member operatively engageable with the holding member for removably securing the gate arm to the holding member in such orientation as to extend the arm from the actuating means and into said lane, at least one of said members including a fracture inducing element engaging the gate arm and embedable therein upon operative engagement of said clamping member with said holding member to clamp the arm and to simultaneously impress into said arm a structurally weakened fracture line extending transversely across the arm in a flat surface thereof to facilitate the total fracture thereof along said line upon accidental collison between traffic in said lane and said arm.

2. Apparatus as defined in claim 1 wherein said fracture inducing element comprises a serrated edge carried by the clamp member.

3. Apparatus as defined in claim 1 including locking means connected to said holding member and operative to lock said clamp member in operative engagement therewith.

4. A manually operable gate arm clamp for breakable parking gate arms comprising a base plate connectable to a parking gate actuating means, a cover plate permanently secured on each side to said base plate, an opening between said cover plate and said base plate at least at one end of said cover plate to permit insertion of a gate arm, at least one tab on said cover plate extending into said opening ang generally toward said base plate, an L-shaped member pivotally engaging said cover plate under said tab and having serrations across the extremity of the shorter leg of said L-shaped member, said shorter leg adjacent said cover plate tab with said serrations directed generally toward said base plate when said clamp is closed, a slot in the longer leg of said L-shaped member, and an upstanding lock holder secured to said cover plate and extending through said slot when said clamp is closed.

* * * * *